US010356217B2

(12) United States Patent
Pepper et al.

(10) Patent No.: US 10,356,217 B2
(45) Date of Patent: Jul. 16, 2019

(54) VIRTUAL WEATHER GENERATION (71) Applicant: THE BOEING COMPANY, Chicago, IL (US)

(72) Inventors: Craig A. Pepper, Brisbane (AU); Kieran J. Collard, Brisbane (AU); Christopher C. Fowler, Brisbane (AU); Christian T. Shiel, Brisbane (AU)

(73) Assignee: THE BOEING COMPANY, Chicago, IL (US)

( * ) Notice: Subject to any disclaimer, the term of this patent is extended or adjusted under 35 U.S.C. 154(b) by 250 days.

(21) Appl. No.: 15/188,321

(22) Filed: Jun. 21, 2016

(65) Prior Publication Data
US 2017/0366647 A1 Dec. 21, 2017

(51) Int. Cl.
H04L 29/06 (2006.01)
G06F 16/29 (2019.01)
G06F 16/9537 (2019.01)

(52) U.S. Cl.
CPC .............. *H04L 67/38* (2013.01); *G06F 16/29* (2019.01); *G06F 16/9537* (2019.01); *Y02A 90/15* (2018.01)

(58) Field of Classification Search
CPC ............... G06F 17/30241; G06F 16/29; G06F 16/9537; H04L 67/38
USPC ........................................................ 707/770
See application file for complete search history.

(56) References Cited

U.S. PATENT DOCUMENTS 9,583,020 B1* 2/2017 Kronfeld ............... G09B 19/00
2013/0204826 A1* 8/2013 Lee ........................ G06N 5/02
706/46

OTHER PUBLICATIONS

Shukla, J. "Seamless Prediction of Weather and Climate: A New Paradigm for Modeling and Prediction Research." NCEP, Camp Springs, Maryland. Feb. 10, 2009. http://www.nws.noaa.gov/ost/clinnate/STIP/FY09CTBSeminars/shukla_021009.htm (Year: 2009).*

* cited by examiner

*Primary Examiner* — Kimberly L Wilson
(74) *Attorney, Agent, or Firm* — Patterson + Sheridan, LLP (57) ABSTRACT A method and apparatus for providing virtual weather data are described. Embodiments retrieve a plurality of weather data snapshots of historical weather data and provide an API through which a plurality of remote clients request weather data. A request specifying a first set of geographical and spatial coordinates and further specifying a first set of time and date coordinates is received. In response to the request, a first set of weather data is determined from the plurality of weather data snapshots of historical weather data, based on the first set of geographical and spatial coordinates and the first set of time and date coordinates and transmitted to the first remote client. A plurality of follow-on sets of geographical and spatial weather data are also requested and transmitted to the first remote client.

22 Claims, 6 Drawing Sheets

VIRTUAL WEATHER GENERATION

BACKGROUND

This disclosure relates to weather simulation, and more specifically, to techniques for providing a centralized weather simulation server that is remotely accessible using a provided Application Program Interface (API).

Various methodologies have been developed that provide flight training and/or analysis of pre-recorded activities. One methodology provides a realistic, three-dimensional software flight simulation in order to allow pilots to practice flight techniques without actually flying in an airplane (e.g., a flight simulation application). In such programs, a user can complete a simulated flight and then play the simulation back to analyze their performance. Programs of this nature provide realistic simulations of flight in an artificially generated three-dimensional environment in which aircraft behaviors are modeled quite accurately with respect to the physics of flight. Such simulation programs can simulate flights at various geographical locations and in various conditions, e.g., time of day, weather conditions, and so on.

Weather simulation is a difficult and computationally expensive process due to the modeling of airflow, temperature, precipitation, and various other variables. As such, weather simulation systems are generally implemented using high-end computing hardware and/or distributed computing techniques. However, such systems are generally outside of the price range of an ordinary consumer and ill-suited for use in most computer and/or video games.

Nonetheless, some computer programs in the simulation genre depend on weather simulation to provide a realistic virtual world. For example, flight simulation applications may simulate the weather in which the user is flying to render frames that realistically depict the conditions within the virtual world. Furthermore, flight simulation applications can determine whether the user should fly under Visual Flight Rules (VFR) or Instrument Flight Rules (IFR), which in turn can affect the user's actions, including instrument manipulation and communications with air traffic control (ATC).

SUMMARY

One embodiment provides a method and article of manufacture for providing virtual weather data. The method and article of manufacture include retrieving a plurality of weather data snapshots of historical weather data and providing an application program interface (API) through which a plurality of remote clients can request weather data by specifying geographical and spatial coordinates and by further specifying time and date coordinates. The method and article of manufacture also include receiving, from a first remote client of the plurality of remote clients, through the provided API, a request specifying a first set of geographical and spatial coordinates and further specifying a first set of time and date coordinates. Responsive to the request, the method and article of manufacture include transmitting, to the first remote client, a first set of weather data determined from the plurality of weather data snapshots of historical weather data, based on the first set of geographical and spatial coordinates and the first set of time and date coordinates. Additionally, responsive to at least one subsequent request, the method and article of manufacture include transmitting, to the first remote client, a plurality of follow-on sets of geographical and spatial weather data determined from the plurality of weather data snapshots of historical weather data, wherein the plurality of follow-on sets of geographical and spatial weather data are temporally adjacent to the first set of geographical and spatial weather data and are sequenced by time intervals.

In one aspect, in combination with any example above, the first remote client comprises an aircraft flight simulator and the request further specifies a simulated flight path with specific aircraft geographic and spatial coordination and on a specific simulated time and date.

In one aspect, in combination with any example above, transmitting, to the first remote client, the plurality of follow-on sets of geographical and spatial weather data determined from the plurality of weather data snapshots of historical weather data, enables the aircraft flight simulator to provide a real-time weather simulation, without requiring the aircraft flight simulator to search through historical weather data to identify a weather condition corresponding to a desired flight path.

In one aspect, in combination with any example above, multiple remote clients are able to access the API substantially simultaneously in order to access weather data reports at a same geographical, spatial, time and date coordinates, or a different geographical, spatial, time and date coordinates.

In one aspect, in combination with any example above, the first set of weather data includes at least one of (i) temperature data, (ii) wind speed and wind direction data, (iii) humidity data, (iv) cloud condition data, (v) atmospheric condition data, (vi) pressure data and (vii) precipitation data.

In one aspect, in combination with any example above, storing the plurality of weather data snapshots of historical weather data within a weather system database, where the weather system database comprises at least one of a historical index software library and a weather instance software library.

In one aspect, in combination with any example above, the historical index software library provides weather data to a weather simulator inquiry based on a simulated predetermined geographical and spatial coordinate and a predetermined time and date coordinate.

In one aspect, in combination with any example above, the weather system database updates on a real-time basis from an external weather information provider on the weather instance software library, thereby enabling the weather instance software library to provide real-time weather data information to the remote clients based on requests specifying geographic and spatial coordinates.

In one aspect, in combination with any example above, the weather instance software library provides real-time weather data to a weather simulator inquiry for simulation of a flight condition based on a predetermined geographical and spatial coordinates on a real-time basis.

In one aspect, in combination with any example above, the real-time weather data information is provided responsive to an inquiry from an aircraft based on a predetermined geographic and spatial coordinates flight path for flight path planning of an imminent future flight or an ongoing flight.

In one aspect, in combination with any example above, retrieving a plurality of weather data snapshots of historical weather data further comprises accessing an external weather information provider including National Oceanic and Atmospheric Administration (NOAA) database, and storing the plurality of weather data snapshots within a weather system database.

In one aspect, in combination with any example above, retrieving a plurality of weather data snapshots of historical weather data further comprises indexing the plurality of weather data snapshots within the weather system database based on geographical, spatial, time and date coordinates, and indexing the plurality of weather data snapshots within the weather system database based on measures of temperature, pressure, wind speed, wind direction, humidity, cloud condition and precipitation, at each geographic and spatial location of the respective weather data snapshot.

In one aspect, in combination with any example above, transmitting, to the first remote client, the first set of weather data determined from the plurality of weather data snapshots of historical weather data, based on the first set of geographical and spatial coordinates and the first set of time and date coordinates, further comprises analyzing two or more of the plurality of weather data snapshots of historical weather data adjacent to the first set of geographical and spatial coordinates and the first set of time and date coordinates, in order to determine interpolated weather data, and transmitting the interpolated weather data to the first remote client as the first set of weather data.

In one aspect, in combination with any example above, retrieving the plurality of weather data snapshots of historical weather data further comprises accessing a gridded weather file, and unpacking the plurality of weather data snapshots of historical weather data from within the gridded weather file.

In one aspect, in combination with any example above, the gridded weather file is organized in a NOAA GRIB2 format.

Another embodiment provides a method of requesting virtual weather data. The method includes initiating execution of a simulation application for a first virtual vehicle and determining a first set of geographical and spatial coordinates for the first virtual vehicle. The method also includes determining a first set of date and time coordinates for the first virtual vehicle. Additionally, the method includes transmitting a request, to a weather server system, over a data communications network, specifying the first set of geographical and spatial coordinates and the first set of date and time coordinates for the first virtual vehicle. The method further includes receiving, from the weather server system, over the data communications network, a first set of weather data, and providing a weather simulation in the simulation application based on the first set of weather data. Responsive to transmitting at least one subsequent request, the method includes receiving, from the weather server system, over the data communications network, a plurality of follow-on sets of weather data that are temporally adjacent to the first set of weather data, and updating the weather simulation in the simulation application using the plurality of follow-on sets of weather data.

In one aspect, in combination with any example above, the simulation application comprises an aircraft flight simulator, wherein the request further specifies a simulated flight path with specific aircraft geographic and spatial coordination and on a specific simulated time and date, and wherein the plurality of follow-on sets of weather data enable the aircraft flight simulator to provide the weather simulation in real-time and without requiring the aircraft flight simulator to search through historical weather data to identify a weather condition corresponding to a desired flight path.

In one aspect, in combination with any example above, the first set of weather data comprises at least one of (i) temperature data, (ii) wind speed and wind direction data, (iii) humidity data, (iv) cloud condition data, (v) atmospheric condition data, (vi) pressure data and (vii) precipitation data.

In one aspect, in combination with any example above, the weather server system is further configured to analyze two or more of a plurality of weather data snapshots of historical weather data adjacent to the first set of geographical and spatial coordinates and the first set of time and date coordinates, in order to determine interpolated weather data, and to transmit the interpolated weather data as the first set of weather data.

Another embodiment provides a non-transitory computer-readable medium containing computer program code that, when executed, performs an operation. The operation includes providing a simulation of a first virtual vehicle within a first virtual environment. The operation includes determining a first set of geographical and spatial coordinates for the first virtual vehicle. The operation also includes determining a first set of date and time coordinates for the first virtual vehicle. Additionally, the operation includes transmitting a request, to a weather server system, over a data communications network, specifying the first set of geographical and spatial coordinates and the first set of date and time coordinates for the first virtual vehicle. The operation further includes receiving, from the weather server system, over the data communications network, a first set of weather data. Moreover, the operation includes providing a weather simulation in the simulation of the first virtual vehicle based on the first set of weather data. Responsive to transmitting at least one subsequent request, the operation includes receiving, from the weather server system, over the data communications network, a plurality of follow-on sets of weather data that are temporally adjacent to the first set of weather data. The operation additionally includes updating the weather simulation in the simulation of the first virtual vehicle using the plurality of follow-on sets of weather data.

In one aspect, in combination with any example above, the provided simulation comprises an aircraft flight simulation, the request further specifies a simulated flight path with specific aircraft geographic and spatial coordination and on a specific simulated time and date, and the plurality of follow-on sets of weather data enable weather simulation in real-time and without requiring local searching through historical weather data to identify a weather condition corresponding to a desired flight path.

In one aspect, in combination with any example above, the first set of weather data comprises at least one of (i) temperature data, (ii) wind speed and wind direction data, (iii) humidity data, (iv) cloud condition data, (v) atmospheric condition data, (vi) pressure data and (vii) precipitation data, and the weather server system is further configured to analyze two or more of a plurality of weather data snapshots of historical weather data adjacent to the first set of geographical and spatial coordinates and the first set of time and date coordinates, in order to determine interpolated weather data, and to transmit the interpolated weather data as the first set of weather data.

DETAILED DESCRIPTION

In operating an aircraft, a pilot may generate a flight plan from a start location to a destination location. The flight plan may specify information about the flight, such as a flight path from a starting point to an ending point defined using waypoints. Other information may include an estimated time en route, information about the aircraft, alternate airports, information about the passengers, and other suitable information. In generating a flight plan, a pilot may take into account weather conditions and other circumstances. Oftentimes, the flight plan may include predetermined routes such as airways. These airways may be used even though they may not provide the most direct flight to a destination.

One challenge when incorporating weather simulation into a simulation application is the high computational cost of providing an accurate weather simulation. Generally speaking, currently weather simulators use a substantial amount of computing resources in order to perform accurate weather simulations. This high computational use can render advanced weather simulations ill-suited for incorporation into flight simulation applications and other games and virtual worlds. Moreover, incorporating a weather simulation directly into a simulation application creates a considerable implementation overhead. Additionally, when each simulation application produces its own respective weather simulation, it can be challenging if not impossible to synchronize the simulated weather across multiple simulation applications. As such, when running a simulation exercise involving multiple participants (e.g., multiple pilots in a single flight simulation environment), it can be difficult to synchronize the weather simulation between the multiple simulation applications for the multiple participants.

As described herein, a weather simulator refers to any computer program code that, when executed, provides data representative of a weather simulation. Generally, such weather simulation data can include measures of temperature, measures of air pressure, measures of wind speed, measures of wind direction, measures of precipitation, measures of cloud coverage, and so on. More generally, any information relating to or characterizing weather can be included in a weather simulation, consistent with the functionality described herein.

Generally, embodiments provide techniques for providing a weather server from which remote clients can query weather simulation data. For instance, the weather server could retrieve a plurality of weather data snapshots of historical weather data. As an example, the weather server could retrieve sets of gridded weather data (e.g., National Oceanic and Atmospheric Administration (NOAA) gridded climate data sets) and could generate a data repository containing all of the sets of gridded weather data. In one embodiment, the sets of gridded weather data contain measurements of different weather metrics (e.g., temperature, precipitation, wind speed, wind direction, etc.) over a window of time (e.g., at 6 hour intervals). Moreover, the sets of gridded weather data can contain measurements of weather metrics not only at different geographic locations, but at different elevations as well.

Furthermore, the sets of gridded weather can contain not only the observed weather conditions at each location (geographic and spatial), but also the conditions that had been forecast for each location. Such forecast data could be used, for example, where a client simulator wishes to request the forecast weather information at points along a route and to use such information for flight planning (e.g., enter into a flight computer to determine cruising altitude). Continuing the example, as the simulated flight progresses, the client simulator can request the actual observed weather. The client simulator can use the observed weather to set the weather conditions in the simulator, possibly leading the pilot to adjust the flight plan in response to conditions that are different from what was forecast.

Additionally, the weather server could generate a data model that enables the weather server to interpolate weather data values at times, locations and elevations that are not explicitly measured within the retrieved weather data snapshots. For instance, while the weather data snapshots may include historical weather measurements at 6 hour intervals, the weather server could use the data model to interpolate weather measurements at any time in between the historical capture times, e.g., based on the historical values captured at temporally adjacent times. Likewise, the weather server could use the data model to interpolate weather measurements at locations and elevations that were not included in the weather data snapshots.

The weather server could provide an application program interface (API) through which remote clients can request weather data by specifying geographical and spatial coordinates and by further specifying time and date coordinates. The weather server could then receive, through the provided API, from a remote client, a request specifying a particular geographic location, elevation, date and time, and the weather server. The weather server, in response to the received request, could transmit to the remote client, a first set of weather data determined from the plurality of weather data snapshots of historical weather data, based on the first set of geographical and spatial coordinates and the first set of time and date coordinates.

The weather server could subsequently transmit, to the remote client, responsive to subsequent requests from the remote client, follow-on sets of geographical and spatial weather data determined from the plurality of weather data snapshots of historical weather data, where the plurality of follow-on sets of geographical and spatial weather data are temporally adjacent to the first set of geographical and spatial weather data and are sequenced by time intervals. For instance, the remote client can be configured to request the follow-on sets of weather data as the simulated flight progresses. Additionally, and of note, the remote client can request the follow-on sets of weather data in advance of needing the follow-on weather data, e.g., requesting future sets of weather data based on the flight plan of the simulated aircraft. Doing so enables the client device to obtain and cache weather data for an entire flight plan, and in the event the simulated flight deviates from the flight plan, the client device could request additional follow-on weather data based on an updated flight path.

Additionally, embodiments described herein can facilitate the efficient search of historical weather data, e.g., to find historical dates and times that match a given set of weather conditions. For example, embodiments could receive a query specifying a set of weather conditions (e.g., temperature, wind speed & direction, humidity, cloud cover, precipitation, and so on), and could efficiently search to determine historical dates and times on which the observed weather matches the specified set of weather conditions. Embodiments could then return an indication of the historical dates and times to the requestor, e.g., a remote client device. Doing so enables a remote client simulator to simulate a flight from a particular location in realistic weather conditions that match a set of search desired criteria.

Figure 1:
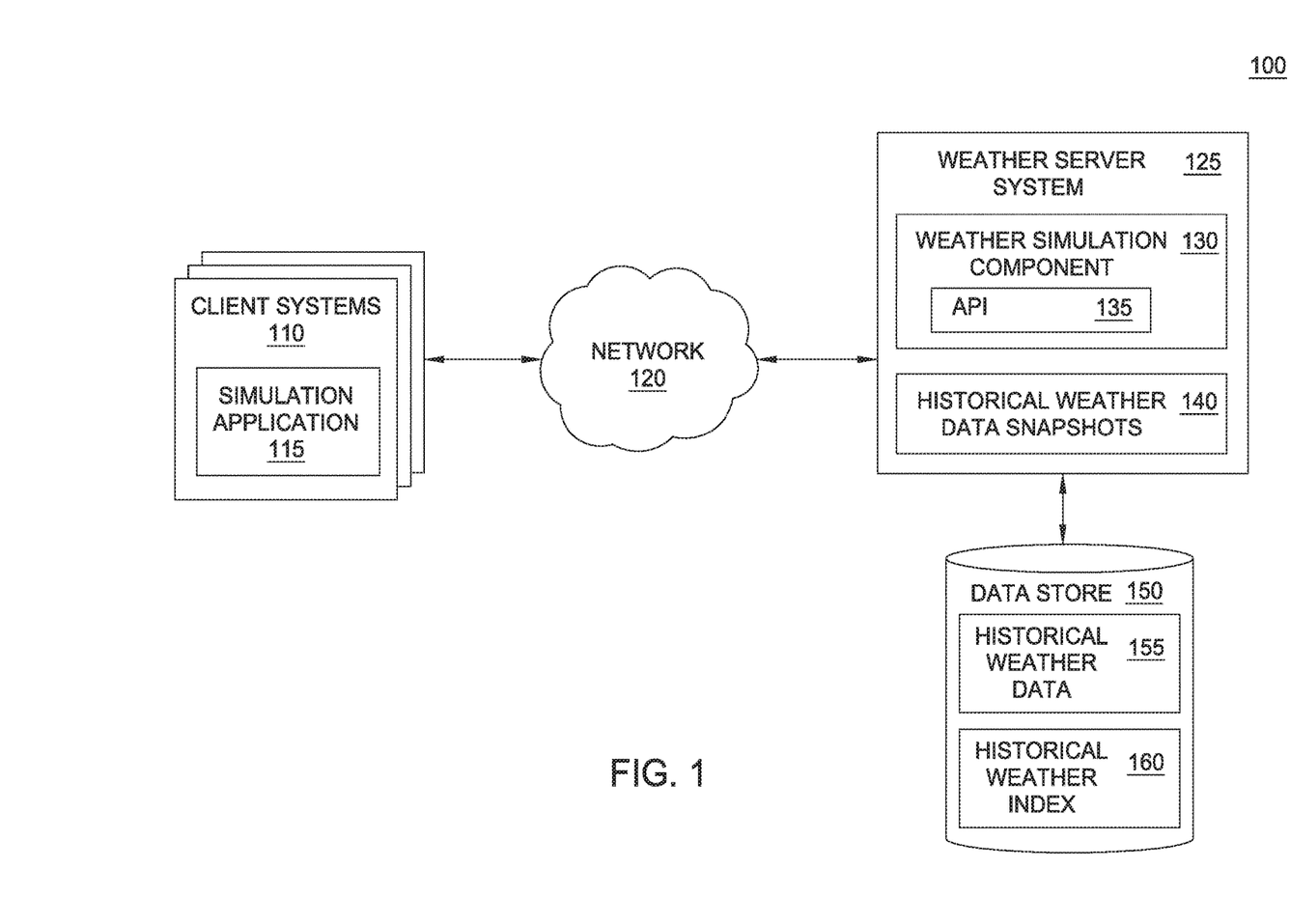
FIG. 1 is a block diagram illustrating a weather simulation environment, according to one embodiment described herein.

FIG. 1 is a block diagram illustrating a weather simulation environment, according to one embodiment described herein. As shown, the environment 100 includes a plurality of client systems 110 and a weather server system 125, communicatively connected via a network 120. The weather server system 125 is further communicatively connected to a data store 150, which contains historical weather data 155 and a historical weather index 160. Each client system 110 contains a respective simulation application 115. For example, in one embodiment the simulation application 115 represents a flight simulation application. The weather server system 125 contains a weather simulation component 130, which provides an API 135, and historical weather data snapshots 140. The API 135 enables the simulation applications 115 to submit requests for weather data from the weather simulation component 130. The historical weather data snapshots 140 represent historical weather data retrieved by the weather simulation component 130 from the data store 150. For example, the weather simulation component 130 could retrieve portions of the historical weather data 155, using the historical weather index 160, where the portions specify historically captured weather measurements at multiple locations, elevations and intervals. The retrieved portions of historical weather data could be chosen through querying the historical weather indexes 160 to find dates and times that match a given set of weather conditions. Generally, multiple remote clients are able to request weather data by accessing the API 135 substantially simultaneously in order to access weather data reports (e.g., weather at the same geographical, spatial, time and date coordinates, weather at different geographical, spatial, time and date coordinates, etc.).

Generally, the weather simulation component 130 is configured to provide weather data to the simulation applications 115 on the client systems 110, in response to queries submitted by the simulation applications 115 through the API 135. As an example, a simulation application 115 on a client system 110 could submit a request for weather data specifying geographical and spatial coordinates as well as time and date coordinates. The weather simulation component 130 could then, in response to the received request, interpolate a first set of weather data from the historical weather data snapshots 140, based on the specified geographical, spatial, date and time values in the request, and could transmit the first set of weather data to the simulation application 115 over the network 120. The weather simulation component 130 could, responsive to subsequent client requests, transmit follow-on sets of geographical and spatial weather data determined from the historical weather data snapshots 140, e.g., where the follow-on sets of geographical and spatial weather data are temporally adjacent to the first set of geographical and spatial weather data.

Figure 2:
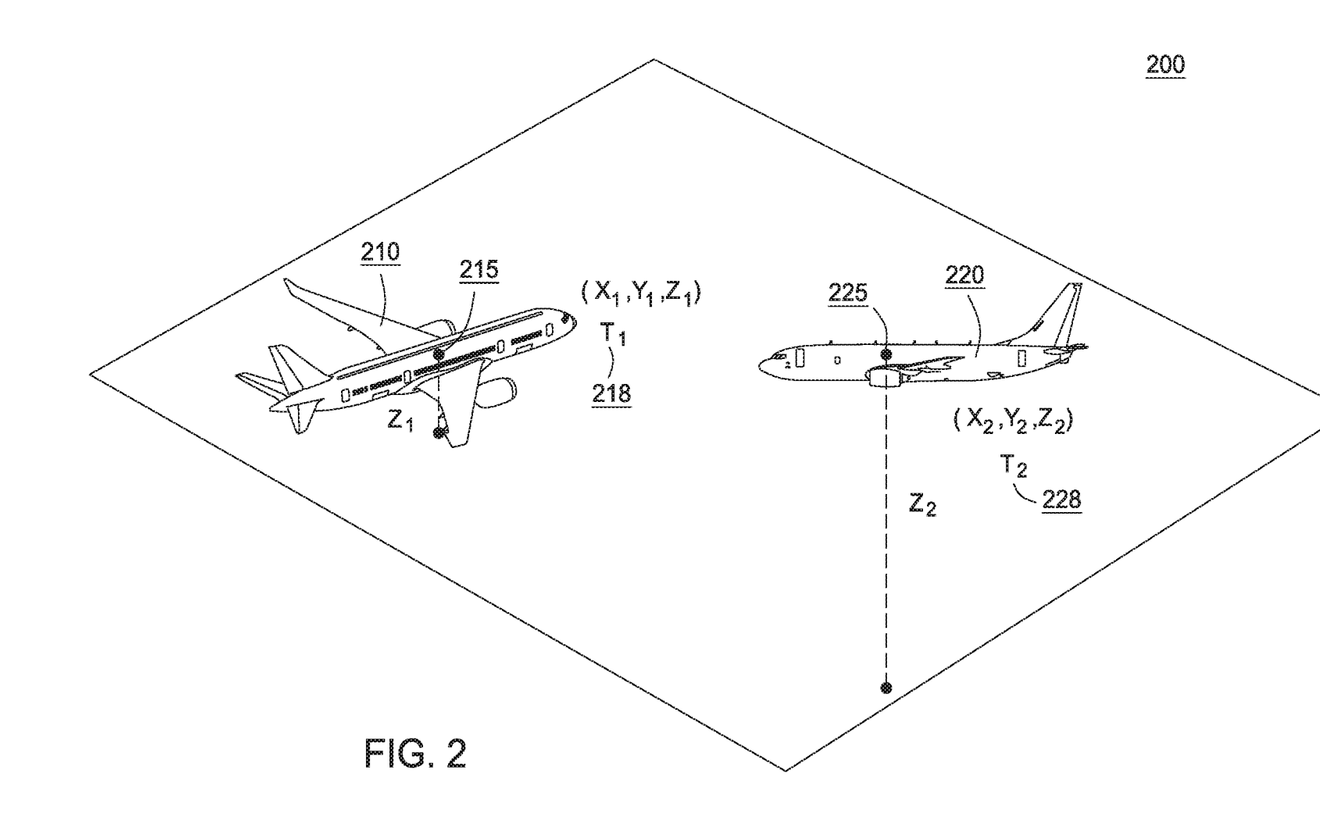
FIG. 2 is an illustration of a virtual world for a flight simulation application, according to one embodiment described herein.

FIG. 2 is an illustration of a virtual world for a flight simulation application, according to one embodiment described herein. For purposes of this example, assume that the virtual world 200 that is shared by two flight simulation applications (e.g., simulation applications 115 running on different client systems 110), with one simulation application 115 simulating the aircraft 210 and a second simulation application 115 simulating the aircraft 220. As shown, the virtual world 200 includes an aircraft 210, at position ($X_1$, $Y_1$, $Z_1$) 215 at time $T_1$ 218, and an aircraft 220 at position ($X_2$, $Y_2$, $Z_2$) 225 at time $T_2$ 228. The simulation application 115 simulating the aircraft 210 could submit a request for weather information to the API 135 of the weather simulation component 130, specifying the time 218 and positional information 215 corresponding to the simulated aircraft 210, in order to retrieve weather data, and could use the weather data to provide a weather simulation within the virtual world 200. Likewise, the simulation application 115 simulating the aircraft 220 could submit a request for weather information to the API 135 of the weather simulation component 130, specifying the time 228 and positional information 225 corresponding to the simulated aircraft 220, in order to retrieve weather data for simulating weather within the virtual world 200 for the aircraft 220. Doing so enables multiple simulation applications 115 to provide a weather simulation for their respective simulated aircrafts within virtual world 200, without requiring either of the simulation applications 115 to independently model the weather simulation.

Figure 3:
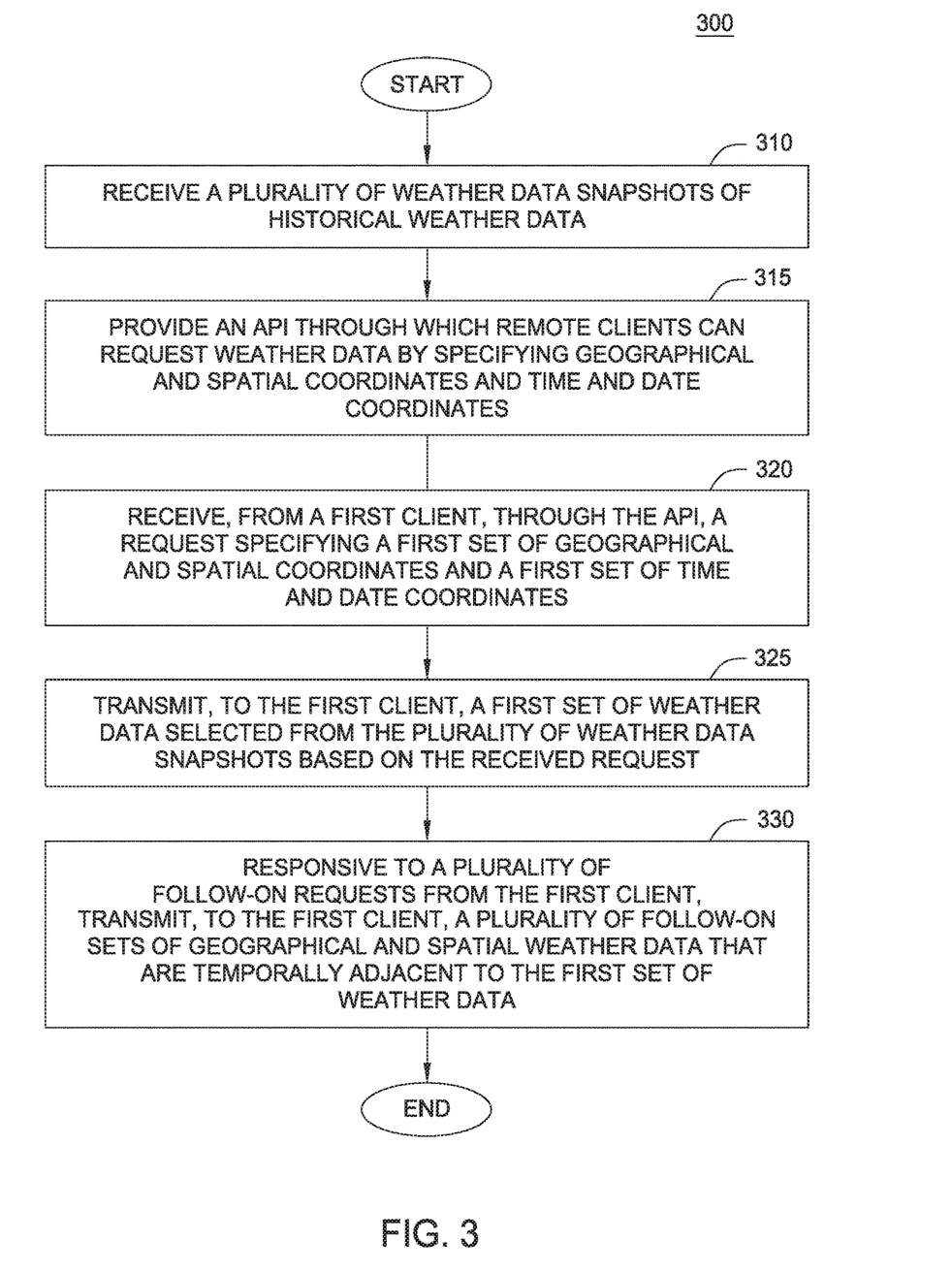
FIG. 3 is a flow diagram illustrating a method of providing simulated weather data to a client application, according to one embodiment described herein.

FIG. 3 is a flow diagram illustrating a method of providing simulated weather data to a client application, according to one embodiment described herein. As shown, the method 300 begins at block 310, where the weather simulation component 130 receives a plurality of weather data snapshots of historical weather data. The weather simulation component 130 could store the plurality of weather data snapshots of historical weather data within a weather system database. For instance, the weather system database could be accessible by a historical index software library configured to retrieve historically measured weather values at particular geographical and spatial coordinates and at a particular date and time, and could be further accessible by the weather simulation component 130, for use in modelling simulated weather data.

In one embodiment, receiving the plurality of weather data snapshots of historical weather data includes accessing an external weather information provider (e.g., a National oceanic and atmospheric administration (NOAA) database) and storing data retrieved from the external weather information provide within a weather database. For example, the weather simulation component 130 could retrieve a plurality of gridded weather files from the external weather information provider and could unpack the plurality of gridded weather files (e.g., organized in the NOAA GRIB2 file format) to extract the plurality of weather data snapshots of historical weather data. The weather simulation component 130 could then store the extracted weather data snapshots in the weather database. Additionally, the weather simulation component 130 could index the weather data snapshots within the weather database based on geographical, spatial, time and date coordinates. Also, the weather simulation component 130 could index the weather data snapshots within the weather database based on weather conditions (e.g., temperature, pressure, wind speed, wind direction, humidity, cloud conditions, precipitation, etc.). Doing so enables the efficient retrieval of the weather data from within the database.

In one embodiment, the weather simulation component 130 is configured to retrieve weather system database updates (e.g., updated weather data snapshots) on a real-time basis from an external weather information provider. Doing so enables the weather simulation component 130 to provide real-time weather data information to the remote clients. For example, the weather simulation component 130 could provide real-time weather data in response to a submitted query from a flight simulator for simulation of a flight condition for a virtual aircraft. In one embodiment, the weather simulation component 130 is configured to provide real-time weather data responsive to an inquiry from a computing system of a physical aircraft, based on specified geographic and spatial coordinates and a flight path. Such weather data could be used for flight path planning of an imminent future flight or an ongoing flight of the physical aircraft.

The weather simulation component 130 provides an API through which remote clients can request weather data by sending a request specifying geographical and spatial coordinates (e.g., latitude, longitude and altitude coordinates for a three-dimensional virtual world) as well as time and date coordinates (block 315). In one embodiment, the remote client can specify geographic and spatial coordinates and a set of weather conditions as search criteria. The weather simulation component 130 can use the historical weather index 160 to select historical dates and times that match the given search criteria.

The weather simulation component 130 receives, from a first client, through the provided API, a request specifying a first set of geographical and spatial coordinates and a first set of time and date coordinates (block 320). For example, the weather simulation component 130 could receive one or more data packets over a data communications network, specifying coordinate information corresponding to a simulated aircraft within a virtual world of a flight simulator.

Upon receiving the request, the weather simulation component 130 could determine weather data corresponding to the specified geographical and spatial coordinates and the time and date coordinates within a weather simulation. For example, the weather simulation component 130 could construct a weather simulation model using the plurality of weather data snapshots and could interpolate weather data corresponding to the specified geographical and spatial coordinates and the time and date coordinates using the weather simulation model. The weather simulation component 130 then transmits, to the first client, the determined first set of weather data (block 325). For example, the weather data could include temperature data, wind speed and wind direction data, humidity data, cloud condition data, atmospheric condition data, and so on.

Subsequently, in response to a plurality of follow-on requests from the first client system, the weather simulation component 130 transmits a plurality of follow-on sets of geographical and spatial weather data that are temporally adjacent to the first set of weather data (block 330), and the method 300 ends. For example, the first client could determine a flight plan of the simulated vehicle and could determine the future geographic and spatial coordinates of the simulated vehicle at future points in time, based on the flight plan. The first client could also consider attributes of the virtual vehicle (e.g., as specified in the request), such as the speed of the vehicle. The first client could transmit the subsequent requests to the weather simulation component 130, and the weather simulation component 130 could then use the weather simulation model to determine additional weather data corresponding to the future geographic and spatial coordinates of the simulated vehicle. The weather simulation component 130 could then transmit the determined weather data to the first client. Doing so enables the first client (e.g., an aircraft flight simulator) to provide a real-time weather simulation, without requiring the remote client to search through historical weather data to identify weather conditions corresponding to a desired flight path.

Figure 4:
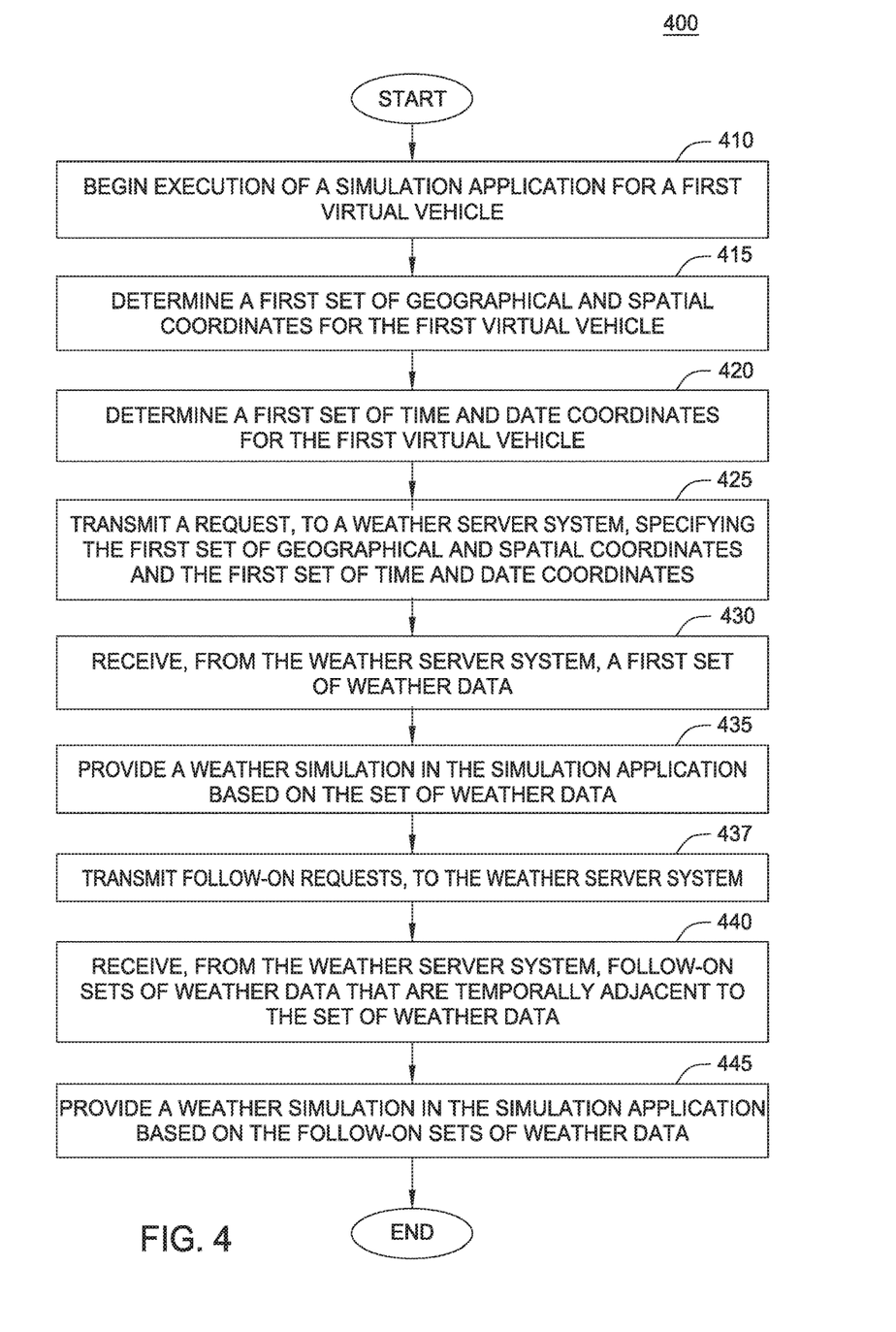
FIG. 4 is a flow diagram illustrating a method of retrieving simulated weather data from a centralized weather server system, according to one embodiment described herein.

FIG. 4 is a flow diagram illustrating a method of retrieving simulated weather data from a centralized weather server system, according to one embodiment described herein. As shown, the method 400 begins, where a simulation application 115 for a first virtual vehicle (e.g., an aircraft) begins executing on a client system (block 410). The simulation application 115 determines a first set of geographical and spatial coordinates corresponding to the first virtual vehicle (block 415). For example, the simulation application 115 could determine a current position of the first virtual vehicle within the simulated virtual environment. The simulation application 115 could further determine flight path and movement attributes (e.g., speed) of the vehicle within the virtual environment. Additionally, the simulation application 115 determines a first set of time and date coordinates for the first virtual vehicle (block 420). For example, client can specify a particular historical date and time in a request for follow-on sets of weather data. For instance, the simulation application 115 could determine a current date and time and could use this information for the first virtual vehicle. As another example, the simulation application 115 could determine a historical date and time that is being simulated by the simulation application 115, e.g., where the simulation application 115 is simulating a flight during a particular historical weather pattern. Additionally, the simulation application 115 could determine additional information describing the virtual vehicle, such as a speed of the virtual vehicle, a flight plan for the virtual vehicle, and so on, and could use this additional information to determine future geographic and spatial locations for the virtual vehicle.

The simulation application 115 transmits a request, to a weather server system, specifying the first set of geographical and spatial coordinates and the first set of date and time coordinates (block 425). In one embodiment, the simulation application 115 can transmit a request, to the weather system, specifying weather condition criteria. In response to transmitting the request, the simulation application 115 receives, from the weather server system, a first set of weather data (block 430). For example, the weather data could specify measures of temperature, measures of air pressure, measures of wind speed, measures of wind direction, measures of precipitation, measures of cloud coverage, and so on, corresponding to the first set of geographical and spatial coordinates and the first set of date and time coordinates specified in the request.

The simulation application 115 uses the received first set of weather data to provide a weather simulation for the first virtual vehicle (block 435). The simulation application 115 transmits additional requests for follow-on sets of weather data to the weather server system (block 437) and, at block 440, the simulation application 115 receives, from the weather server system, follow-on sets of weather data that are temporally adjacent to the first set of weather data and corresponding to the requests. For example, the simulation application 115 could determine predicted sets of geographical and spatial coordinates and a predicted set of date and time coordinates for the first virtual vehicle (e.g., based on the first virtual vehicle's flight path) and could transmit follow-on requests for weather data specifying the predicted coordinates. The weather simulation component 130 on the weather server system could determine the follow-on sets of weather data, by interpolating weather metrics from historical weather data, based on the follow-on requests received from the simulation application 115, and could transmit the follow-on sets of weather data to the simulation application 115. The simulation application 115 provides a weather simulation for the first virtual vehicle using the follow-on sets of weather data (block 445) and the method 400 ends.

Figure 5:
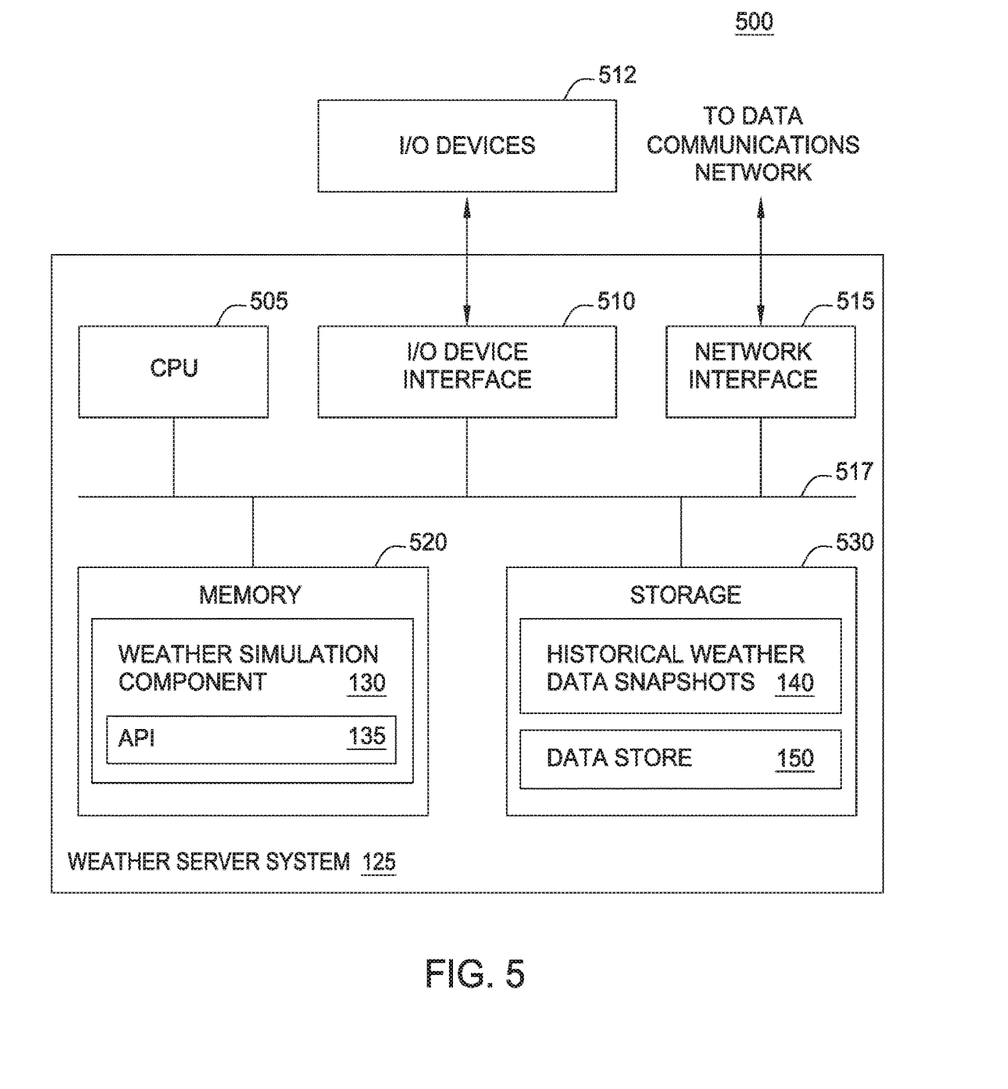
FIG. 5 is a block diagram illustrating a weather server system configured with a weather simulation component, according to one embodiment described herein.

FIG. 5 is a block diagram illustrating a weather server system configured with a weather simulation component, according to one embodiment described herein. As shown the computing system 500 includes, without limitation, a central processing unit (CPU) 505, a network interface 515, a memory 520, and storage 530, each connected to a bus 517. The computing system 500 may also include an I/O device interface 510 connecting I/O devices 512 (e.g., keyboard, mouse, and display devices) to the computing system 500. Further, in context of this disclosure, the computing elements shown in the computing system 500 may correspond to a physical computing system (e.g., a system in a data center) or may be a virtual computing instance executing within a computing cloud.

Generally, the CPU 505 retrieves and executes programming instructions stored in the memory 520 as well as stores and retrieves application data residing in the memory 520. The bus 517 is used to transmit programming instructions and application data between CPU 505, I/O devices interface 510, storage 530, network interface 515, and memory 520. Note, CPU 505 is included to be representative of a single CPU, multiple CPUs, a single CPU having multiple processing cores, and the like. Memory 520 is generally included to be representative of a random access memory. Storage 530 may be a disk drive storage device. Although shown as a single unit, storage 530 may be a combination of fixed and/or removable storage devices, such as fixed disc drives, removable memory cards, or optical storage, network attached storage (NAS), or a storage area-network (SAN).

As shown, storage contains historical weather data snapshots 140 and data store 150. For example, the historical weather data snapshots 140 could represent weather data extracted from gridded weather files, e.g., gridded weather files downloaded from a NOAA database and formatted in the NOAA GRIB2 format. The memory 520 includes a weather simulation component 130, which in turn provides an API 135. Generally, the weather simulation component 130 is configured to provide simulated weather data to remote clients. For example, the weather simulation component 130 could receive, from a first remote client of the plurality of remote clients, through the provided API 135, a request specifying a first set of geographical and spatial coordinates and further specifying a first set of time and date coordinates. Responsive to the received request, the weather simulation component 130 could transmit, to the first remote client, a first set of weather data determined from the plurality of weather data snapshots of historical weather data, based on the first set of geographical and spatial coordinates and the first set of time and date coordinates. Responsive to follow-on requests for weather data received from the first remote client, the weather simulation component 130 could further transmit, to the first remote client, a plurality of follow-on sets of geographical and spatial weather data determined from the plurality of weather data snapshots of historical weather data, where the plurality of follow-on sets of geographical and spatial weather data are temporally adjacent to the first set of geographical and spatial weather data and are sequenced by time intervals.

Figure 6:
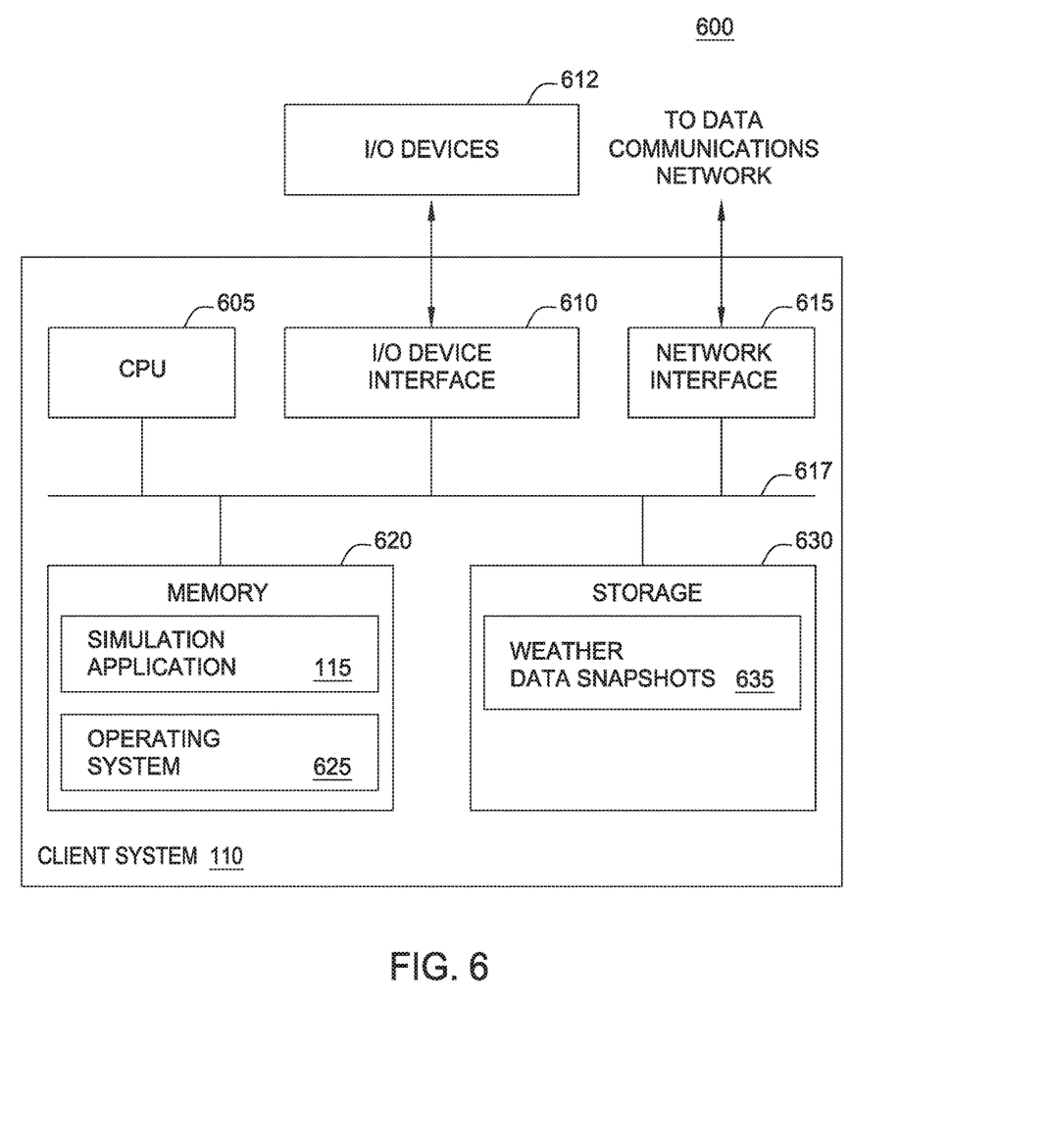
FIG. 6 is a block diagram illustrating a client system configured with a simulation application, according to one embodiment described herein.

FIG. 6 is a block diagram illustrating a client system configured with a simulation application, according to one embodiment described herein. As shown the computing system 600 includes, without limitation, a central processing unit (CPU) 605, a network interface 615, a memory 620, and storage 630, each connected to a bus 617. The computing system 600 may also include an I/O device interface 610 connecting I/O devices 612 (e.g., keyboard, mouse, and display devices) to the computing system 600. Further, in context of this disclosure, the computing elements shown in the computing system 600 may correspond to a physical computing system (e.g., a system in a data center) or may be a virtual computing instance executing within a computing cloud.

Generally, the CPU 605 retrieves and executes programming instructions stored in the memory 620 as well as stores and retrieves application data residing in the memory 620. The bus 617 is used to transmit programming instructions and application data between CPU 605, I/O devices interface 610, storage 630, network interface 615, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

As shown, the storage 630 contains weather data snapshots 635. The weather data snapshots 635 represent weather data received from a weather simulation system (e.g., weather server system 500). The memory 620 includes a simulation application 115 and an operation system 625. The simulation application 115 generally represents any vehicle simulation application (e.g., a flight simulator). In the context of the present disclosure, the simulation application 115 can determine a first set of geographical and spatial coordinates for a first virtual vehicle being simulated, and the simulation application 115 further determines a first set of date and time coordinates for the first virtual vehicle. The simulation application 115 then transmits a request, to a weather server system, over a data communications network, specifying the first set of geographical and spatial coordinates and the first set of date and time coordinates for the first virtual vehicle. The simulation application 115 then receives, from the weather server system, over the data communications network, a first set of weather data. The simulation application 115 can then use the weather data to provide a weather simulation for the virtual vehicle. The simulation application 115 can further determine predicted future locations for the virtual vehicle and can transmit coordinates (e.g., geographic and spatial coordinates) corresponding to the predicted future locations to the weather server system. The simulation application 115 could then receive, from the weather server system, over the data communications network, follow-on sets of weather data that are temporally adjacent to the first set of weather data and can update the weather simulation for the first virtual vehicle based on the follow-on sets of weather data. Doing so enables the simulation application 115 to provide a weather simulation for the first virtual vehicle, without having to implement weather modelling logic.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the weather server system 125) or related data available in the cloud. For example, the weather simulation component 130 could retrieve a plurality of weather data snapshots of historical weather data and could provide an application program interface (API) through which a plurality of remote clients can request weather data by specifying geographical and spatial coordinates and by further specifying time and date coordinates. The weather simulation component 130 could receive, from a first remote client of the plurality of remote clients, through the provided API, a request specifying a first set of geographical and spatial coordinates and further specifying a first set of time and date coordinates. Responsive to the received request, the weather simulation component 130 could transmit, to the first remote client, a first set of weather data determined from the plurality of weather data snapshots of historical weather data, based on the first set of geographical and spatial coordinates and the first set of time and date coordinates. Responsive to at least one subsequent request, the weather simulation component 130 could transmit, to the first remote client, a plurality of follow-on sets of geographical and spatial weather data determined from the plurality of weather data snapshots of historical weather data, wherein the plurality of follow-on sets of geographical and spatial weather data are temporally adjacent to the first set of geographical and spatial weather data and are sequenced by time intervals. Doing so allows remote clients to access this weather information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method to improve realism in aircraft flight simulation by implementing real-time weather simulation based on real-world weather data, the computer-implemented method comprising:
    subsequent to retrieving a plurality of weather data snapshots of historical real-world weather data, generating a data model by a server and based on the plurality of weather data snapshots of historical real-world weather data;
    providing, by the server, an application programming interface through which a plurality of remote clients request weather data by specifying geographical and spatial coordinates and by further specifying time and date coordinates, the plurality of remote clients including a first remote client comprising an aircraft flight simulator;
    receiving, from the aircraft flight simulator, through the provided application programming interface, a request specifying a first set of geographical and spatial coordinates and further specifying a first set of time and date coordinates;
    generating, by operation of one or more computer processors of the server, an interpolated set of geographical and spatial weather data based on (i) the data model, (ii) the first set of geographical and spatial coordinates, and (iii) the first set of time and date coordinates, wherein the interpolated set is transmitted to the first remote client aircraft flight simulator; and
    responsive to at least one subsequent request, transmitting, to the aircraft flight simulator, a plurality of follow-on sets of geographical and spatial weather data, wherein the plurality of follow-on sets are generated based on the data model, are temporally distinct from the interpolated set and one another, and are sequenced by time intervals, wherein the interpolated set and the follow-on sets are not explicitly specified in the plurality of weather data snapshots, wherein the aircraft flight simulator is configured to provide a real-time weather simulation with an improved measure of realism relative to the real-time weather simulation being provided in an absence of the interpolated set and the follow-on sets.

2. The computer-implemented method of claim 1, wherein the request further specifies a simulated flight path with specific aircraft geographic and spatial coordination and on a specific simulated time and date.

3. The computer-implemented method of claim 2, wherein the real-time weather simulation is provided without requiring the aircraft flight simulator to search through historical weather data to identify a weather condition corresponding to any desired flight path.

4. The computer-implemented method of claim 1, wherein multiple remote clients are able to access the application programming interface concurrently in order to access weather data reports at a same geographical, spatial, time and date coordinates, or a different geographical, spatial, time and date coordinates.

5. The computer-implemented method of claim 1, wherein the interpolated set of geographical and spatial weather data comprises at least one of (i) temperature data, (ii) wind speed and wind direction data, (iii) humidity data, (iv) cloud condition data, (v) atmospheric condition data, (vi) pressure data and (vii) precipitation data.

6. The computer-implemented method of claim 1, further comprising storing the plurality of weather data snapshots of historical real-world weather data within a weather system database, where the weather system database comprises at least one of a historical index software library and a weather instance software library.

7. The computer-implemented method of claim 1, wherein retrieving a plurality of weather data snapshots of historical real-world weather data comprises:
    accessing an external weather information provider including National Oceanic and Atmospheric Administration (NOAA) database; and
    storing the plurality of weather data snapshots within a weather system database.

8. The computer-implemented method of claim 1, wherein retrieving a plurality of weather data snapshots of historical real-world weather data comprises:
    storing the plurality of weather data snapshots within a weather system database;
    indexing the plurality of weather data snapshots within the weather system database based on geographical, spatial, time and date coordinates; and
    indexing the plurality of weather data snapshots within the weather system database based on measures of temperature, pressure, wind speed, wind direction, humidity, cloud condition and precipitation, at each geographic and spatial location of the respective weather data snapshot.

9. The computer-implemented method of claim 1, wherein retrieving the plurality of weather data snapshots of historical real-world weather data comprises:
    accessing a gridded weather file; and
    unpacking the plurality of weather data snapshots of historical real-world weather data from within the gridded weather file.

10. The computer-implemented method of claim 1, wherein the request further specifies a simulated flight path with specific aircraft geographic and spatial coordination and on a specific simulated time and date;
    wherein the aircraft flight simulator is configured to provide the real-time weather simulation without having to search through historical weather data to identify any weather condition corresponding to any desired flight path
    wherein multiple remote clients are able to access the application programming interface concurrently in order to access weather data reports at a same geographical, spatial, time and date coordinates, or a different geographical, spatial, time and date coordinates.

11. The computer-implemented method of claim 10, wherein the interpolated set of geographical and spatial weather data comprises (i) temperature data, (ii) wind speed and wind direction data, (iii) humidity data, (iv) cloud condition data, (v) atmospheric condition data, (vi) pressure data and (vii) precipitation data;
   wherein the plurality of weather data snapshots of historical real-world weather data is stored within a weather system database, where the weather system database comprises a historical index software library and a weather instance software library;
   wherein the historical index software library provides weather data to a weather simulator inquiry based on a simulated predetermined geographical and spatial coordinate and a predetermined time and date coordinate.

12. The computer-implemented method of claim 11, wherein the weather system database updates on a real-time basis from an external weather information provider on the weather instance software library, thereby enabling the weather instance software library to provide real-time weather data information to the remote clients based on requests specifying geographic and spatial coordinates;
   wherein the weather instance software library provides real-time weather data to a weather simulator inquiry for simulation of a flight condition based on a predetermined geographical and spatial coordinates on a real-time basis;
   wherein the real-time weather data information is provided responsive to an inquiry from an aircraft based on a predetermined geographic and spatial coordinates flight path for flight path planning of an imminent future flight or an ongoing flight.

13. The computer-implemented method of claim 12, wherein retrieving the plurality of weather data snapshots of historical real-world weather data comprises:
   accessing an external weather information provider including National Oceanic and Atmospheric Administration (NOAA) database;
   storing the plurality of weather data snapshots within the weather system database;
   indexing the plurality of weather data snapshots within the weather system database based on geographical, spatial, time and date coordinates; and
   indexing the plurality of weather data snapshots within the weather system database based on measures of temperature, pressure, wind speed, wind direction, humidity, cloud condition and precipitation, at each geographic and spatial location of the respective weather data snapshot.

14. The computer-implemented method of claim 13, wherein generating the interpolated set of geographical and spatial weather data comprises:
   analyzing two or more of the plurality of weather data snapshots of historical weather data adjacent to the first set of geographical and spatial coordinates and the first set of time and date coordinates, in order to determine interpolated weather data, wherein the interpolated weather data is transmitted to the first remote client as the interpolated set of weather data;
   wherein retrieving the plurality of weather data snapshots of historical weather data further comprises accessing a gridded weather file and unpacking the plurality of weather data snapshots of historical weather data from within the gridded weather file.

15. The computer-implemented method of claim 14, wherein the server comprises a weather server system operatively connected to the plurality of remote clients via a data communications network, wherein the aircraft flight simulator is configured to:
   initiating execution of a simulation application for a first virtual vehicle;
   determining the first set of geographical and spatial coordinates for the first virtual vehicle;
   determining the first set of date and time coordinates for the first virtual vehicle;
   transmitting the request to the weather server system over the data communications network;
   receiving, from the weather server system over the data communications network, the interpolated set of geographical and spatial weather data;
   providing a weather simulation in the simulation application based on the interpolated set of geographical and spatial weather data;
   responsive to transmitting the at least one subsequent request, receiving, from the weather server system over the data communications network, the plurality of follow-on sets of geographical and spatial weather data; and
   updating the weather simulation in the simulation application using the plurality of follow-on sets of geographical and spatial weather data.

16. A non-transitory medium containing computer program code executable to perform an operation to improve realism in aircraft flight simulation by implementing real-time weather simulation based on real-world weather data, the operation comprising:
   subsequent to retrieving a plurality of weather data snapshots of historical real-world weather data, generating a data model by a server and based on the plurality of weather data snapshots of historical real-world weather data;
   providing, by the server, an application programming interface through which a plurality of remote clients request weather data by specifying geographical and spatial coordinates and by further specifying time and date coordinates, the plurality of remote clients including a first remote client comprising an aircraft flight simulator;
   receiving, from the aircraft flight simulator, through the provided application programming interface, a request specifying a first set of geographical and spatial coordinates and further specifying a first set of time and date coordinates;
   generating, by operation of one or more computer processors of the server when executing the computer program code, an interpolated set of geographical and spatial weather data based on (i) the data model, (ii) the first set of geographical and spatial coordinates, and (iii) the first set of time and date coordinates, wherein the interpolated set is transmitted to the first remote client aircraft flight simulator; and
   responsive to at least one subsequent request, transmitting, to the aircraft flight simulator, a plurality of follow-on sets of geographical and spatial weather data, wherein the plurality of follow-on sets are generated based on the data model, are temporally distinct from the interpolated set and one another, and are sequenced by time intervals, wherein the interpolated set and the follow-on sets are not explicitly specified in the plurality of weather data snapshots, wherein the aircraft flight simulator is configured to provide a real-time weather simulation with an improved measure of realism relative to the real-time weather simulation being provided in an absence of the interpolated set and the follow-on sets.

17. A computer-implemented method to improve realism in aircraft flight simulation by implementing real-time weather simulation based on real-world weather data, the computer-implemented method comprising:

initiating execution of a simulation application in order to provide an aircraft flight simulation that includes a first virtual aircraft;

determining, for the first virtual aircraft, (i) a first set of geographical and spatial coordinates and (ii) a first set of date and time coordinates;

transmitting a request over a data communications network to a weather server system, the request specifying the first set of geographical and spatial coordinates and further specifying the first set of date and time coordinates;

receiving, over the data communications network, an interpolated set of geographical and spatial weather data generated by the weather server system based on (i) a data model, (ii) the first set of geographical and spatial coordinates, and (iii) the first set of data and time coordinates;

providing a real-time weather simulation in the simulation application by operation of one or more computer processors and based on the interpolated set;

responsive to transmitting at least one subsequent request, receiving, over the data communications network, a plurality of follow-on sets of geographical and spatial weather data, wherein the plurality of follow-on sets are generated based on the data model, are temporally distinct from the interpolated set of geographical and spatial weather data and one another, and are sequenced by time intervals, wherein the interpolated set and the follow-on sets are not explicitly specified in a plurality of weather data snapshots used to generate the data model; and updating the real-time weather simulation in the simulation application and based on the plurality of follow-on sets, wherein the real-time weather simulation is provided with an improved measure of realism relative to the real-time weather simulation being provided in an absence of the interpolated set and the follow-on sets.

18. The computer-implemented method of claim 17, wherein the simulation application comprises an aircraft flight simulator, wherein the request further specifies a simulated flight path with specific aircraft geographic and spatial coordination and on a specific simulated time and date, wherein the aircraft flight simulator is configured to provide, based on the interpolated set and the follow-on sets, the weather simulation in real-time and without requiring the aircraft flight simulator to search through historical weather data to identify a weather condition corresponding to a desired flight path.

19. The computer-implemented method of claim 17, wherein the interpolated set of geographical and spatial weather data comprises at least one of (i) temperature data, (ii) wind speed and wind direction data, (iii) humidity data, (iv) cloud condition data, (v) atmospheric condition data, (vi) pressure data and (vii) precipitation data.

20. A non-transitory computer-readable medium containing computer program code executable to perform an operation to improve realism in aircraft flight simulation by implementing real-time weather simulation based on real-world weather data, the operation comprising:

providing an aircraft flight simulation that includes a first virtual aircraft within a first virtual environment;

determining, for the first virtual aircraft, (i) a first set of geographical and spatial coordinates and (ii) a first set of date and time coordinates;

transmitting a request, over a data communications network to a weather server system, the request specifying the first set of geographical and spatial coordinates and further specifying the first set of date and time coordinates;

receiving, over the data communications network, an interpolated set of geographical and spatial weather data, wherein the interpolated set is generated by the weather server system based on (i) a data model, (ii) the first set of geographical and spatial coordinates, and (iii) the first set of data and time coordinates;

providing a real-time weather simulation in the aircraft flight simulation by operation of one or more computer processors when executing the computer program code, and based on the interpolated set;

responsive to transmitting at least one subsequent request, receiving, over the data communications network, a plurality of follow-on sets of geographical and spatial weather data, wherein the plurality of follow-on sets are generated based on the data model, are temporally distinct from the interpolated set and one another, and are sequenced by time intervals, wherein the interpolated set and the follow-on sets are not explicitly specified in a plurality of weather data snapshots used to generate the data model; and updating the real-time weather simulation in the aircraft flight simulation and based on the plurality of follow-on sets, wherein the real-time weather simulation is provided with an improved measure of realism relative to the real-time weather simulation being provided in an absence of the interpolated set and the follow-on sets.

21. The non-transitory computer-readable medium of claim 20, wherein the request further specifies a simulated flight path with specific aircraft geographic and spatial coordination and on a specific simulated time and date, wherein the interpolated set and follow-on sets enable weather simulation in real-time and without requiring local searching through historical weather data to identify a weather condition corresponding to a desired flight path.

22. The non-transitory computer-readable medium of claim 20, wherein the interpolated set of geographical and spatial weather data comprises at least one of (i) temperature data, (ii) wind speed and wind direction data, (iii) humidity data, (iv) cloud condition data, (v) atmospheric condition data, (vi) pressure data and (vii) precipitation data.

* * * * *

UNITED STATES PATENT AND TRADEMARK OFFICE
CERTIFICATE OF CORRECTION

PATENT NO. : 10,356,217 B2  
APPLICATION NO. : 15/188321  
DATED : July 16, 2019  
INVENTOR(S) : Craig A. Pepper et al.

It is certified that error appears in the above-identified patent and that said Letters Patent is hereby corrected as shown below:

In the Claims

In Column 17, Lines 48-49, in Claim 1, after "the" delete "first remote client".

In Column 20, Lines 55-56, in Claim 16, after "the" delete "first remote client".

In Column 22, Line 13, in Claim 20, delete "request," and insert -- request --, therefor.

Signed and Sealed this  
Thirty-first Day of December, 2019

Andrei Iancu  
*Director of the United States Patent and Trademark Office*